United States Patent Office 3,462,756
Patented Aug. 19, 1969

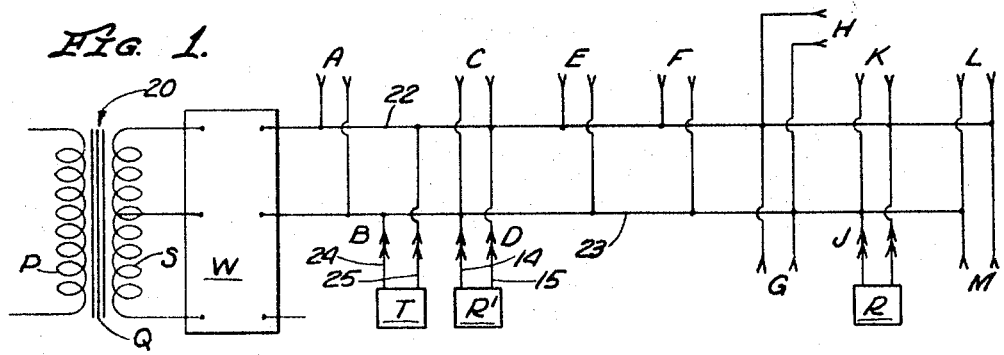
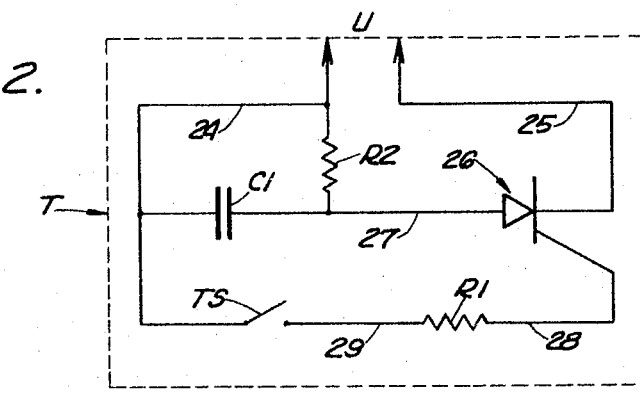
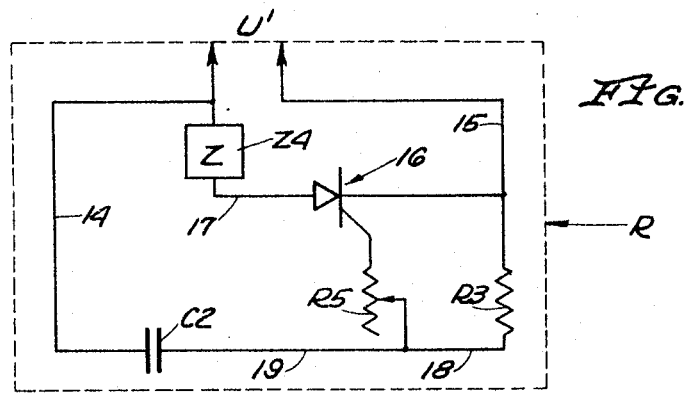

3,462,756
APPARATUS FOR TRANSMITTING AND RECEIVING A HIGH FREQUENCY TRANSIENT OVER A POWER LINE
George A. Mills, 1320 Highridge St., Riverside, Calif. 92506
Filed Apr. 28, 1967, Ser. No. 634,557
Int. Cl. H04m 11/04
U.S. Cl. 340—310                              3 Claims

ABSTRACT OF THE DISCLOSURE

A signaling system having a transmitting or control station and a receiving or controlled station both of which are connected across first and second conductors of an A.C. utility line which is continuously energized for accommodating electric utility-line loads such as appliances, and the transmitting station of which is arranged to provide during each control signal period a short-duration utility-line short circuit once during each alternate half-cycle of the A.C. utility wave, to thereby produce at each such occurrence a high-frequency electric transient signal on the utility line, which transient is received at the receiving station and there made effective to trigger a SCR to conductive state to initiate operation of a signal-activated device such as a relay, an alarm, or the like.

SUMMARY

Briefly, the invention comprehends using existing electric-utility wiring, and the electric energy available thereon in the form of ordinary alternating-current power, for a communication or control channel between a transmitter which can be portable and plugged in at any available utility-line outlet, and a cooperating receiver which similarly may be portable and similarly plugged in at any other (remote) outlet on the line. Suitable means at the transmitting station are connected across the utility line and are effective when actuated (as by closure of a switch) to produce repetitive electric wave transients on the line. The transients utilize the distributed inductance and capacitance of the line as a resonant oscillatory circuit. The repetitive transients serve as the signal which is received at the receiving station and which is utilized to repetitively trigger to conductive state a silicon controlled rectifier (SCR). The current passed by the SCR which is connected between conductors of the A.C. line, is used to actuate a device which either performs the desired operation at the receiver, or otherwise initiates operation of a secondary device, as by energizing a relay. As is evident, distribution transformer means supplying the line serve to localize the signal transmitted.

BRIEF DESCRIPTION OF THE DRAWINGS

The system embodying the invention is illustrated in functional-diagram form and in circuit schematic in exemplary form in the accompanying drawings, in which:

FIGURE 1 is a schematic diagram depicting a local electric power transformer, a customer power line having a plurality of outlet stations, a transmitting component or controlling station plugged into the line at one of the outlet stations (or connected to the power line in some other fashion), and a receiving component or controlled station plugged into the line (or connected to the power line in some other fashion) at another one of the outlet stations;

FIGURE 2 is a schematic diagram showing details of the circuit of the controlling station or transmitter shown diagrammatically in FIGURE 1; and FIGURE 3 is a schematic diagram showing details of the circuits of the controlled station or receiver shown diagrammatically in FIGURE 1.

Description of the Preferred Embodiment

Referring first to FIGURE 1, a typical power line distribution transformer, or section thereof, is indicated at 20, the transformer comprising a primary winding P, a tapped secondary winding S, and a core Q. A selected section of the taped secondary winding S is connected to a line comprising conductors connected to a meter W to which in turn are connected conductors 22 and 23, which latter conductors are connected either by branching conductor pairs or directly, as shown, to a plurality of outlet receptacle terminal pairs such as those indicated at outlet receptacles A, B, C, D, E, F, G, H, J, K, L and M. Thus due to normal energization of the primary winding P the line comprising conductors 22 and 23 is continuously energized and A.C. potential is exhibited between thost conductors whereby household appliances, luminaries, and other ordinary electrical apparatus, for example may be "plugged in" or connected to the line at any of the noted outlet devices A, B, C, etc.

The electrical means described in the preceding paragraph are exemplary of those serving ordinary dwellings and commercial buildings; and it should be understood that while ordinarily such service lines as that comprising conductors 22 and 23 are energized at 120 volts A.C., the invention is equally applicable to other line potentials and other distribution line configurations. As indicated in FIGURE 1, a controlling unit T, hereinafter for convenience termed the transmitter, is plugged into outlet receptable B, and is equally adapted to be plugged into any other one of the similar outlet receptacles. Similarly a controlled unit R, hereinafter for convenience termed the receiver, is adapted to be plugged into any of the outlet receptacles or if desired, permanently connected to the line, and is shown connected to the line at receptacle J. In accord with the invention, operation of transmitter T results in effective operational response by receiver R, by virtue of propagation of a signal along the line comprising conductors 22 and 23 and all branches connected thereto and including the several noted outlet receptacles. Detailed circuit arrangements and operations of the transmitter, and of the receiver, are next explained.

Referring now to FIGURE 2, details of transmitter T of FIGURE 1 are depicted in circuit schematic form. Therein, a plug U, adapted to be plugged into any of the outlet receptacles previously noted, is connected to the circuit components of the transmitter as shown. Thus one terminal of plug U is connected to conductor 24, and the other to conductor 25. Conductor 24 is connected to one pole of a key or switch Ts and by a branch to one pole of a capacitor C1. The conductor 25 is connected to the anode of a silicon controlled rectifier (SCR) 26, the cathode of which is connected to the other pole of capacitor C1 by a conductor 27, and the gate of which SCR is connected by way of a resistor R1 to the other pole of switch Ts, using conductors 28 and 29. A resistor R2 is connected between conductors 24 and 27, in parallel with capacitor C1.

As will be evident to those skilled in the solid-state electronic circuits art, when plug U is plugged into an energized or "live" outlet receptacle, potential is applied across the anode and cathode of SCR 26. Thus the SCR may be made conductive by application of potential of proper polarity to the gate electrode or terminal; and due to the inherent and well known "switch" characteristics of the SCR, current will continue to flow from anode to cathode until the anode-cathode potential is removed, irrespective of the duration of the gate potential. That is, once the SCR is "triggered" by application of gate or triggering potential for even only a moment, anode to cathode current flows until the driving potential disappears or is reduced substantially to zero value. As is evident, if the line power is A.C., conduction by the SCR 26 will cease at or near the end of the half-cycle when polarity reverses.

Thus, with the transmitter circuit T connected as shown, closing of switch Ts (which closure will inevitably occur for a period of at least several A.C. cycles), will result in application of forward bias on the SCR, and current will flow in the circuit R2, 27, 26, 25. Consequently, a voltage drop is created across R2, and hence C1 charges. The sudden flow of current through the SCR incident to initiation of conduction produces a transient potential across the conductors of the line into which plug U is plugged; and that transient appears across all of the outlets or receptacle terminals A, C, D, H, etc., to which the line is connected. As the polarity of the line reverses at the commencement of the next half-cycle, the SCR becomes reversely biased, and current flow in the forward direction ceases and the device again becomes nonconducting. During the succeeding half-cycle nonconducting period, capacitor C1 discharges through resistor R2, and the circuit comes again to initial condition. Thus repeatedly during the period of closure of switch Ts a series of transients in the form of sharply peaked highly damped high frequency oscillations is generated in the line 22–23, the line and circuits being both inductive and capacitive and hence forming an oscillatory circuit.

The above-noted transient created in the line as conduction through the SCR 26 is initiated can be maximized by so selecting circuit component values that conduction commences when the A.C. line voltage wave approaches its peak or maximum value, as is evident to those skilled in the art. The transient is created in a brief period of time of the order of less than a microsecond, the voltage across the plug terminals rapidly decreasing as conduction is initiated and thereafter rising rapidly as capacitor C1 charges. As the line voltage decreases during the succeeding quarter cycle and falls to a value of the order of 10 volts or less, the SCR 26 becomes nonconducting and capacitor C1 commences discharging and the first transient oscillation cycle terminates. Thus cyclically, as long as switch Ts is held closed, transients are created and transmitted along the line 22–23 one transient oscillation for each positive half-cycle of the A.C. potential wave. As will be evident, transformer 20 provides an effective blocking means for preventing any serious propagation of the transients over the entire power distribution system.

With the transient potential waves or spikes being produced on line 22–13 as previously described, the receiver or controlled station (R) depicted in detail in FIGURE 3 is rendered active. It is evident that as a practical matter the receiver R must remain "plugged in" or connected to the line 22–23, whereby it is ready to receive a signal (transient) transmitted by the transmitter. Referring to FIGURE 3, the receiver circuit comprises a SCR 16, resistor R3, impedance Z4 and resistor R5 capacitor C2, and conductors including those labeled 14, 15, 16, 17, 18 and 19, all connected as shown. Since the receiver is to perform a useful function, the receiver load is here represented by impedance Z4, it being understood that Z4 may be a relay coil, a lamp filament, a bell electromagnet, a valve solenoid or other electric-current-energized device.

Since it is desired that the receiver remain inactive, that is, ineffective to pass operating current through impedance Z4 and SCR 16 in the absence of a transmitted signal, the SCR trigger circuit is devised to be insensitive to all normal voltage waves on the power line 22–23. As is made evident in the previous description of the transmitter T, the SCR 16 will conduct current unidirectionally through Z4 and conductor 15 only when a sufficiently high triggering potential is applied to the SCR gate terminal via resistor R5. Accordingly the low-frequency impedance of the trigger circuit comprising capacitor C2, resistor R3 and variable resistor (potentiometer) R5 is made to be quite high, whereas the impedance offered to very high frequency waves such as the transients of the transmitter signal is relatively low; thus the receiver is made to respond to only the latter signals. Thus, in the receiver circuit, the following considerations apply: (a) The impedance Z2 of capacitor C2 is defined by the equation $Z2 = \frac{1}{2\pi fC2}$, wherein $f$ is the frequency in hertz of the applied potential. (b) Since the potential drop across C2 is 90° (approximately) out of phase with that across R3, the effective impedance of C2 and R3 is given by:

$$|Z| = [(\tfrac{1}{2}\pi fC2)^2 + R3^2]^{\frac{1}{2}}$$

and the maximum voltage across R3 and the gate circuit of SCR 16 is:

$$V_{GC} = V_{L(max)}(R3/|Z|) \sin(\omega t + \theta)$$

wherein $V_L$ is the line voltage and $\theta = \arctan(Z/R3)$, $V_{GC}$ leading $V_L$ by about 90° (since R3 is made small relative to Z). Since $|Z2|$ is considerably greater than R3 at the usual line frequency (60 hertz, generally, is the frequency of commercial A.C. service in the United States), then $V_{GC}$ (the gate circuit potential produced by an oscillation on the line) can be approximately defined by:

$$V_{GTC} > V_{GC(max)} = V_{L(max)} R3 (2\pi fC2)$$

wherein $V_{GTC}$ represents the gate potential required to trigger the SCR 16 into conduction, and taking $|Z|$ as approximately equal to Z2. Thus, as is evident from the above equation for $|Z|$, it is clear that $V_{GC(max)}$ must be less than $V_{GTC}$ if SCR 16 is to be prevented from triggering by ordinary line voltage. Thus, for example, if C2 is chosen to be of 0.01 mfd. value and R3 is chosen to be 10 ohms, then $V_{GC(max)} = 4.5 \times 10^{-3}$ volts (4.5 millivolts), a value far below the approximately 0.3 volt necessary to trigger SCR 16 to the conductive state.

It can be shown by conventional calculation that if C2 is selected of 0.01 mfd. value and R3 of 10 ohms value as noted, and the transient oscillation frequency is of the order of $10^6$ hertz, the gate circuit of SCR 16 will be subjected to only an extremely small fractional part of the 60 hertz frequency line voltage (usually the latter is of the order of 115 volts), but will be subjected to a very high percentage (of the order of 90%) of the $10^6$ hertz transient potential. Thus gating of SCR 16 is restricted to times when a high frequency transient oscillation appears on line 22–23.

A variable resistor R5 is placed in the gate terminal connection of SCR 16, principally as an aid in setting the threshold level at which spurious line signals are rejected. The value of R5 required in any specific installation depends upon the line distance separating receiver R from transmitter T, and is preferably adjusted to provide optimum results in each particular transmitter-receiver environment. With the two stations quite close together the value of R5 may be as high as 6 kiloohms (5K).

The result of operation of the receiver circuit, as viewed by the load device represented by impedance Z4, is rectification of substantially all but the first part of each positive half wave of the line potential. That is, following triggering of the SCR at near the peak of the positive half cycle voltage rise, current flows through the Z4 load device until it drops to something of the order of 10 ma. That occurs during each positive half cycle of the line voltage during the entire period of transmitter operation. The unidirectional current pulses course through the load device (Z4), wherein the power thus furnished can be smoothed, integrated, or used directly as in lighting a filament of an indicator lamp, or to operate a relay, buzzer or solenoid or other device, according to the need of the particular receiving station. If the transmitter-receiver environment is such that exceptionally severe line transients are troublesome, the load device (Z4) can include a pulse counting circuit or like means whereby only a repetitive series of transient pulse signals in rapid succession will cause effective response of the receiving station to the transmitted signals.

As is evident, more than one receiver can be utilized in connection with the transmitter T; and such another receiver is indicated at R', plugged into line 22—23 at receptacle D.

Typical exemplary circuit components and electrical values of the exemplary transmitter and receiver circuits of the system of the invention as illustrated are tabulated in Table I.

TABLE I

| | | |
|---|---|---|
| R1 | ohms | 2,000→10,000 |
| R2 | do | 10,000 |
| R3 | do | 01→00 |
| R5 | do | 0→5,000 |
| C1 | mfd | 0.01 |
| C2 | mfd | 0.01 |
| SCR 16 | | C20B (General Electric) |
| SCR 26 | | C20B (General Electric) |

10,000 ohms > Z4 > 10 ohms for pure resistance.

I claim:

1. A signaling system adapted for utilizing an energized local electric power distribution line for local signaling or control between a transmitting or controlling station and a receiving or controlled station, said system comprising, with said line:

(a) a transmitting station, having transmitting means including a circuit having line terminals adapted for connection to such power distribution line and further including a first SCR having a gate terminal, air anode and a cathode and said circuit having an anode-to-cathode path serially connected across said terminals, said circuit further comprising SCR gate-circuit means including a switch, connected to supply triggering potential to said gate terminal incident to operation of said switch, to thereby transmit on said line a high-frequency transient electric oscillation signal, and (b) a receiving station having receiving means including a circuit having receiver line terminals adapted for connection to such line and further including a load device and a second SCR having a gate terminal and an anode-to-cathode path connected in series with said load device across said receiver line terminals, and further including a triggering circuit connected between said gate terminal and a selected one of said receiver line terminals, to thereby trigger said second SCR into conduction incident to reception of a transmitted signal, (c) whereby operaton of said load device is controllable from said transmitting station remote from said receiving station.

2. A system according to claim 1, in which said triggering circuit of said receiving station comprises a capacitor exhibiting a very high impedance to A.C. potentials of frequencies of the order of less than one thousand hertz and exhibiting a low impedance to A.C. potentials of frequencies of the order of one megahertz.

3. A system according to claim 1, in which said transmitting means comprises in said anode-to-cathode path between said line terminals a resistive device, and in parallel with said resistive device capacitive means for receiving a surge of current incident to conduction by said first SCR.

References Cited

UNITED STATES PATENTS 3,264,628 8/1966 Voigt et al. _____ 340—310 X
3,399,397 8/1968 Josephson _____ 340—216

JOHN W. CALDWELL, Primary Examiner

M. SLOBASKY, Assistant Examiner

U.S. Cl. X.R.

307—252; 340—216, 288

PO-1050
(5/69)

UNITED STATES PATENT OFFICE
CERTIFICATE OF CORRECTION

Patent No. 3,462,756          Dated August 19, 1969

Inventor(s) George A. Mills

It is certified that error appears in the above-identified patent and that said Letters Patent are hereby corrected as shown below:

Column 2, line 9, for "taped" read --tapped--; line 19, for "thost" read --those--.
Column 3, line 52, for "22-13" read --22-23--; line 59, after "R5" insert a comma.
Column 5, line 15, "01→ 00" should read --10→∞--; line 33, for "air" read --an--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents